United States Patent
Jagota (10) Patent No.: US 12,327,199 B2
(45) Date of Patent: Jun. 10, 2025

(54) MULTI-SCALE EXPONENTIAL-SMOOTHING FORECASTER FOR TIME SERIES DATA

(71) Applicant: salesforce.com, inc., San Francisco, CA (US)

(72) Inventor: Arun Kumar Jagota, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 1173 days.

(21) Appl. No.: 17/144,896

(22) Filed: Jan. 8, 2021

(65) Prior Publication Data

US 2022/0222547 A1    Jul. 14, 2022

(51) Int. Cl.
| | |
|---|---|
| *G06N 5/04* | (2023.01) |
| *G06F 9/50* | (2006.01) |
| *G06F 16/28* | (2019.01) |
| *G06N 20/00* | (2019.01) |

(52) U.S. Cl.
CPC ............ *G06N 5/04* (2013.01); *G06F 9/5083* (2013.01); *G06F 16/283* (2019.01); *G06N 20/00* (2019.01); *G06F 2209/5019* (2013.01); *G06F 2209/503* (2013.01); *G06F 2209/508* (2013.01)

(58) Field of Classification Search
CPC ........ G06N 5/04; G06N 20/00; G06F 9/5083; G06F 16/283; G06F 2209/5019; G06F 2209/503; G06F 2209/508; G06F 11/3409; G06F 11/3433; G06F 11/3447; G06F 11/321; G06F 11/3034

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

*Primary Examiner* — Kenneth Tang (57) ABSTRACT

System determines, for first value at first time in time series, first estimate based on value and velocity for time series, first lag, and first time. System determines, for first value, second estimate based on value and velocity for time series, second lag, and first time. System determines first weight based on difference between second value, at second time in time series, and first estimate and second weight based on difference between second value and second estimate. System determines, for second value, first forecast based on value and velocity for time series, first lag, and second time. System determines, for second value, second forecast based on value and estimated velocity for time series, second lag, and second time. System determines, for second value, combined forecast based on first forecast weighed by first weight and second forecast weighed by second weight. If combined forecast satisfies threshold, system outputs alert.

20 Claims, 4 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,281,969 B1* | 3/2022 | Rangapuram ............ G06N 7/01 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2019/0173765 A1* | 6/2019 | Bertran ................ H04L 41/147 |
| 2019/0370610 A1* | 12/2019 | Batoukov ........... G06F 11/0709 |
| 2019/0379589 A1* | 12/2019 | Ryan .................... G06F 17/142 |
| 2020/0074274 A1* | 3/2020 | Fan ....................... G06F 17/18 |
| 2020/0322703 A1* | 10/2020 | Bures ................... G06F 16/27 |
| 2021/0105228 A1* | 4/2021 | Joseph ............... H04L 43/0817 |
| 2021/0173045 A1* | 6/2021 | Hu ......................... G01S 7/415 |
| 2021/0231447 A1* | 7/2021 | Ahmed ................. G06N 20/00 |
| 2021/0319306 A1* | 10/2021 | Leite Pinheiro de Paiva .............. G06F 16/957 |
| 2022/0253727 A1* | 8/2022 | Watson ................. G06N 20/00 |
| 2022/0292308 A1* | 9/2022 | Schwiep ............ G06F 18/2163 |
| 2023/0236818 A1* | 7/2023 | Saeki .................. G06N 3/0442 717/172 |

* cited by examiner

MULTI-SCALE EXPONENTIAL-SMOOTHING FORECASTER FOR TIME SERIES DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Creating and maintaining cloud-based computing platforms may be exceedingly complex, as thousands of computer servers and other resources in geographically disparate locations may serve billions of customer-initiated requests daily on a global scale. Millions of applications may run on these servers on behalf of customers, either directly or indirectly. These customers want all their requests and applications to execute correctly, quickly, and efficiently. An application slow-down, or even worse, a computer resource unavailability, can cause a customer to lose money, which may cause the platform provider to lose the customer. Customers typically expect computer resource availability to be 99.99+percent. Beyond computer resource availability, customer satisfaction is adversely impacted if computer services run slower than customer expectations.

In view of the complexity of these challenges, combined with the stringency of these requirements, a new specialty field developed, which may be referred to as application performance monitoring or computer performance monitoring. Computer performance can be the functioning of an electronic device for storing and processing data, typically in binary form, according to instructions given to it in a variable program. Application performance monitoring helps cloud-based computing vendors to detect and diagnose disruptions in the performance of their services and applications. Some application performance monitoring solutions can continuously monitor hundreds of millions of metrics, in the form of time series, for potential issues.

A time series can be a sequence of data points that may be indexed, listed, and/or graphed in a chronological time order. Most commonly, a time series is a sequence of discrete values recorded at successive equally spaced points in time. Many domains of applied science and engineering which involve temporal measurements use time series. Time series analysis includes methods for analyzing time series in order to extract meaningful statistics and other characteristics from the values.

Time series forecasting is the use of models to predict future time series values based on previously observed values. The implementation of a computerized database system that can correctly, reliably, and efficiently implement such methods and forecasts must be specialized for processing time series values. Proactive analyses of metrics can forecast potential problems before the problems actually occur. For example, the response time of a particular service may start degrading significantly before subsequently being followed by the disruption of the service.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

In accordance with embodiments described herein, there are provided systems and methods for a multi-scale exponential-smoothing forecaster for time series data. A system determines, for a first value associated with a first time and a time series, a first estimate based on both a value and an estimated velocity associated with the time series, a first lag, and the first time. The system determines, for the first value, a second estimate based on both a value and an estimated velocity associated with the time series, a second lag, and the first time. The system determines a first weight based on a difference between a second value, associated with a second time and the time series, and the first estimate and a second weight based on a difference between the second value and the second estimate. The system determines, for the second value, a first forecast based on both a value and an estimated velocity associated with the time series, the first lag, and the second time. The system determines, for the second value, a second forecast based on both a value and an estimated velocity associated with the time series, the second lag, and the second time. The system determines, for the second value, a combined forecast based on the first weight applied to the first forecast and on the second weight applied to the second forecast. If the combined forecast satisfies a threshold, a time series database system outputs an alert associated with the combined forecast.

Figure 1:
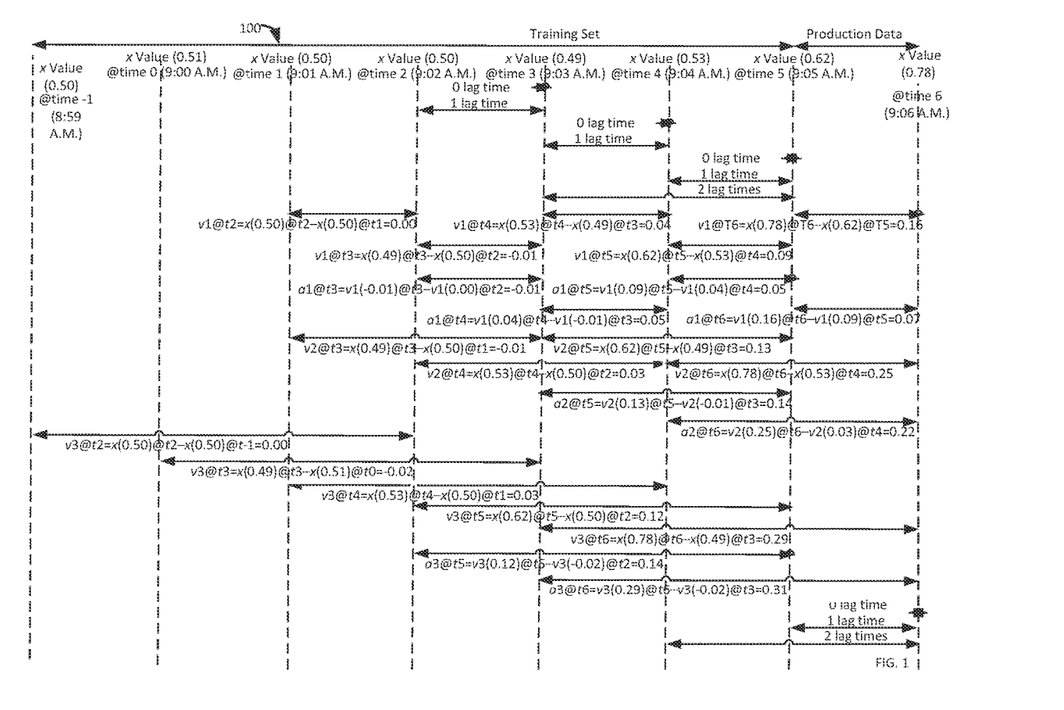
FIG. 1 is an example graph for a multi-scale exponential-smoothing forecaster for time series data, in an embodiment.

For examples, FIG. 1 depicts an example graph for a multi-scale exponential smoothing forecaster for time series data, in which a system has received a training set that includes the time series values of 50% cloud memory utilization at 9:01 A.M., 50% cloud memory utilization at 9:02 A.M., 49% cloud memory utilization at 9:03 A.M., 53% cloud memory utilization at 9:04 A.M., and 62% cloud memory utilization at 9:05 A.M. The system subsequently receives production data that includes the time series value of 78% cloud memory utilization at 9:06 A.M. Table 1 below includes the values, the differences of the values, which are referred to as estimated velocities, and the differences of the differences of the values, which are referred to as estimated accelerations, for various timescales, which may be referred to as lags, as depicted in FIG. 1. Details on the determination and use of these values, estimated velocities, and estimated accelerations are provided further below in further examples, after the following example.

| | Time | | | | | | | |
|---|---|---|---|---|---|---|---|---|
| | 8:59<br>t = −1 | 9:00<br>t = 0 | 9:01<br>t = 1 | 9:02<br>t = 2 | 9:03<br>t = 3 | 9:04<br>t = 4 | 9:05<br>t = 5 | 9:06<br>t = 6 |
| Value | 0.50 | 0.51 | 0.50 | 0.50 | 0.49 | 0.53 | 0.62 | 0.78 |
| Velocity 1 (for 0-lag) | | | | 0.00 | −0.01 | 0.04 | 0.09 | 0.16 |
| Acceleration 1 (for 0-lag) | | | | | −0.01 | 0.05 | 0.05 | 0.07 |
| Velocity 2 (for 1-lag) | | | | | −0.01 | 0.03 | 0.13 | 0.25 |
| Acceleration 2 (for 1-lag) | | | | | | | 0.14 | 0.22 |
| Velocity 3 (for 2-lag) | | | | 0.00 | −0.02 | 0.03 | 0.12 | 0.29 |
| Acceleration 3 (for 2-lag) | | | | | | | 0.12 | 0.31 |

At 9:05 A.M., a time series database system uses the first timescale model with the 0-lag time to determine the first timescale model's estimate of the value of the cloud memory utilization time series at 9:06 A.M. by adding the value of 0.62 at 9:05 A.M., the velocity 1 (for 0-lag) of 0.09 at 9:05 A.M., and the acceleration 1 (for 0-lag) of 0.05 at 9:05 A.M., which equals 0.76. The time series database system also uses the second timescale model with the 1-lag time to determine the second timescale model's estimate of the value of the cloud memory utilization time series at 9:06 A.M. by adding the value of 0.53 at 9:04 A.M. (which is 1-lag time behind the value of 0.62 at 9:05 A.M.), the velocity 2 (for 1-lag) of 0.13 at 9:05 A.M., and the acceleration 2 (for 1-lag) of 0.14 at 9:05 A.M., which equals 0.80. The time series database system receives the new value of 0.78 for the cloud memory utilization time series at the time 9:06 A.M. The time series database system determines the first timescale model's estimate error of 0.02 between the new value of 0.78 and the first timescale model's estimate of 0.76, and the second timescale model's estimate error of −0.02 between the new value of 0.78 and the second timescale model's estimate of 0.80. Then the time series database system determines the weight of 0.50 for the first timescale model's estimate and the weight of 0.50 for the second timescale model's estimate based on their relative estimate errors of 0.02 and −0.02, respectively.

Next, the time series database system uses the first timescale model with the 0-lag time to determine the first timescale model's forecast of the next value of the cloud memory utilization time series at 9:07 A.M. by adding the most recent value of 0.78 at 9:06 A.M. the most recent velocity 1 (for 0-lag) of 0.16 at 9:06 A.M., and the most recent acceleration 1 (for 0-lag) of 0.07 at 9:06 A.M., which equals 1.01. The time series database system also uses the second timescale model with the 1-lag time to determine the second timescale model's forecast of the next value of the cloud memory utilization time series at 9:07 A.M. by adding the value of 0.62 at 9:05 A.M (which is 1-lag time behind the most recent value of 0.78 at 9:06 A.M.), the most recent velocity 2 (for 1-lag) of 0.25 at 9:06 A.M., and the most recent acceleration 2 (for 1-lag) of 0.22 at 9:06 A.M., which equals 1.09. Then the time series database system applies the first timescale model's weight of 0.50 for the first timescale model's estimate to the first timescale model's forecast of 1.01 and the second timescale model's weight of 0.50 for the second timescale model's estimate to the second timescale model's forecast of 1.09 to determine the multi-scale forecast of 1.05 for the cloud memory utilization time series at 9:07 A.M. Since the multi-scale forecast of 1.05 for the cloud memory utilization time series at 9:07 A.M. is above its capacity alert threshold of 0.90, the time series database system outputs a forecast alert that enables immediate allocation of additional cloud memory.

Systems and methods are provided for a multiscale exponential-smoothing forecaster for time series data. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a multiscale exponential-smoothing forecaster for time series data. Next, methods for a multiscale exponential-smoothing forecaster for time series data will be described with reference to example embodiments.

While one or more implementations and techniques are described with reference to an embodiment in which a multi-scale exponential-smoothing forecaster for time series data is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A time series database system can forecast future values of a time series' data based on the time series' historical values that are stored in a time series database, possibly augmented by historic values of additional relevant time series' data. A forecast can be a prediction of a future value. Such a time series database system may be a machine-learning system that operates in a streaming mode, learning continuously and autonomously as new values of time series data arrive. The machine-learning system can rapidly adjust to new norms. such as when there are level, trend, or seasonality shifts in the time series data. The machine-learning system can train incrementally by updating its forecasting timescale models to learn from the new values and forecast future values at any point in time. The machine-learning system can forecast values for any time series, without any human training, and therefore may be autonomous. This capability of functioning autonomously is important in a time series database system which can monitor millions of time series, such that human training of the time series database system on each individual time series is not feasible.

A time series database can be a structured set of information which includes sequences of data points that may be indexed, listed, and/or graphed in chronological time orders. A time series database system can be the computer hardware and/or software that stores and enables access to sequences of data points that may be indexed, listed, and/or graphed in chronological time orders. A machine learning system can be an artificial intelligence tool that has the ability to automatically learn and improve from experience without being explicitly programmed.

The time series database system builds forecasting timescale models for multiple timescales, with each timescale equated to a corresponding lag of time. A lag can be a period of time between recording one value and recording another value. For example, a timescale model with a 0-lag may use the values of the time series that are recorded every minute with a lag of 0 minutes to forecast the future values of the time series, such that the timescale model forecasts the value of the time t+1 minutes based on the value at the time t minutes with a lag of 0 minutes, which is the value at the time t minutes. In another example, a timescale model with a 1-lag may use the values of the time series that are recorded every minute with a lag of 1 minutes to forecast the future values of the time series, such that the timescale model forecasts the value of the time t+1 minutes based on the value at the time t minutes with a lag of 1 minute, which is the value at the time t−1 minutes. For another example, a timescale model with 2-lags may use the values of the time series that are recorded every minute with a lag of 2 minutes to forecast the future values of the time series, such that the timescale model forecasts the value of the time t+1 minutes based on the value at the time t minutes with a lag of 2 minutes, which is the value at the time t−2 minutes. Operating at multiple timescales simultaneously, the time series database system can detect any existing trends at varying timescales, such as milli-secondly, secondly, minutely, hourly, daily, weekly, seasonally, and/or annually. This approach empowers multiple use cases of time series forecasting in the performance monitoring setting. The time series database system's equations are formally described below.

$$\widehat{x_k}(t+h) = x(t-k) + \hat{v}_{k+h} + \hat{a}_{k+h} \quad \text{(Equation 1)}$$

Equation 1 forecasts x(t+h) by a timescale model indexed by k≥0. This timescale model forecasts at the timescale k+h. $\hat{v}_{k+h}$ and $\hat{a}_{k+h}$ are estimates of the velocity and the acceleration at the timescale k+h at forecast time. An estimated velocity can be an approximate determination of the rate at which a value changes. An estimated acceleration can be an approximate determination of the change in the rate at which a value changes. These estimates are maintained as exponentially-smoothed versions of the velocity time series and the acceleration time series at the timescale k+h. Exponential-smoothing favors recency while also smoothing out noise.

$$v_l(t) = x(t) - x(t-l), a_l(t) = v_l(t) - v_l(t-l) \quad \text{(Equation 2)}$$

Each forecasting timescale model operates at a different timescale and has an automatically-computed strength. When generating a combined forecast for a x value in a time series by combining different timescale models' forecasts for the x value for the same forecast time, the time series database system determines how much weight to apply to each timescale model's forecast by determining the accuracy of each timescale model's recent forecasts made at the various timescales. A combined forecast can be prediction of a future value based on multiple predictions of the future value. A weight can be a factor associated with one of a set of numerical quantities, used to represent its importance relative to the other members of the set. The time series database system applies more weight to a timescale model's forecast if the timescale model's previous forecast was more accurate and applies less weight to a timescale model's forecast if the timescale model's previous forecast was less accurate. The multi-scale forecast is:

$$\widehat{x}(t+h) = \Sigma_k p(k|h) \widehat{x_k}(t+h) \quad \text{(Equation 3)}$$

p(k|h) is a distribution over the various timescale models k based on the accuracies of their recent forecasts. More formally, it is as follows. Let $\widehat{e_{k,h}}$ denote the estimate of the forecast error of the timescale model indexed by k on forecasting x(t+h) and $\widehat{e_{min}}(h) = \min_k \widehat{e_{k,h}}$ $$q_{k,h} = e^{-(\widehat{e_{k,h}} - \widehat{e_{min}}(h))} \quad \text{(Equation 4)}$$

$$p(k|h) = q_{k,h} / \Sigma_{k'} q_{k',h} \quad \text{(Equation 5)}$$

The estimates $\widehat{e_{k,h}}$ of the forecast error are also exponentially smoothed, specifically from $e_{k,h}(t) = |x(t+h) - \widehat{x_k}(t+h)|$. In Equation 4, a timescale model's probability decreases exponentially as the timescale model's forecast error increases relative to the forecast error of the timescale model with the smallest forecast error. A sensible variant of Equation 4 is to replace "exponential" by "polynomial." This variant is embodied in:

$$q_{k,h} = 1 / \overline{(e_{k,h} - \widehat{e_{min}}(h))_p} \quad \text{(Equation 4')}$$

Here p is the polynomial's degree, where p=1 is a linear decay, and p>1 is a super-linear decay. The time series database system may either bypass using Equation 4' to determine weights based on comparative forecast errors when the smallest error equals zero or use a placeholder score, such as none or null, when the smallest error equals zero.

After determining a multi-scale forecast of a x value in a time series, the time series database system can store the multi-scale forecast in a time series database as a forecast x value in the x value's time series or in the forecast x value's own dedicated time series. A forecast value can be a predicted numerical amount denoted by an algebraic term, a magnitude, quantity, or number.

The time series database system can leverage historical values in multiple time series. For example, when forecasting the response time of a service based on its recent historical values, the time series database system can also take into account recent historical values of other upstream metrics that potentially impact this response time, such as the request rate, lengths of various internal queues, and utilization levels of various internal resources such as Central Processing Units (CPUs) and memory. Such a multivariate version of the time series database system can forecast future values of a particular time series from historical values of several time series, including the particular time series.

The time series database system can generalize the univariate forecaster to use additional time series as predictors. First, the time series database system formulates the multivariate forecasting problem. Consider an n-dimensional vector time series X(t) and a scalar time series y(t)≡$X_n$(t). The problem that the time series database system addresses here is to forecast y(t+h) from X(t), X(t−1) . . . X(0). The time series database system is forecasting future values of the last time series from the historical values of all the time series, including the last time series. The generalized version operates as follows.

$$\hat{y}_{k,i}(t+h) = X_i(t-k) + \hat{D}_{k+h,i}(t) + \widehat{D2}_{k+h,i}(t) \quad \text{(Equation 6)}$$

Equation 6 forecasts y(t+h) by a timescale model indexed by (k,i). This timescale model forecasts at the timescale k+h. Here $\hat{D}_{k+h,i}(t)$ is an estimate of y(t+h)−Xi(t−k) at time t, and $\widehat{D2}_{k+n,i}(t)$ is an estimate of D(t+h)−D(t+h−k). These are estimates because the time series database system has yet to identify X at any time after time t, let alone at time t+h. These estimates are maintained as exponentially-smoothed versions of the first cross-difference and the second cross-difference time series at scale l≡k+h.

$$D_{l,i}(t) = y(t) - X_i(t-l), D2_{l,i}(t) = D_{l,i}(t) - D_{l,i}(t-l) \quad \text{(Equation 7)}$$

The multivariate, multi-scale forecast is:

$$\hat{y}(t+h) = \Sigma_{k,i} p(k,i|h) \hat{y}_{k,i}(t+h) \quad \text{(Equation 8)}$$

p(k,i) is obtained from the forecast errors of the various timescale models indexed by (k,i), exactly as before.

The time series database system can provide the multi-scale forecasts to proactive, forecast-based, alerting. such as by generating an alert if disk usage is expected to continue rising and reach a specific remaining capacity level within a particular number of time units, such as minutes, hours, days, or weeks. Proactive alerts are especially helpful for addressing concerns about a diminishing computer resource capacity. By the time a computer resource has no more capacity, taking remedial action is too late. When users want to set forecast alerts on the time series of forecast values, the users can select any combination of individualized and grouped thresholds, such as a threshold of 0.90 for cloud memory utilization values, and a threshold of 0.75 for cloud CPU utilization values. The time series database system can trigger forecast alerts when forecast values reach certain thresholds. For example, the time series database system triggers a forecast alert because the increase of 16% cloud memory utilization from 9:05 A.M. to 9:06 A.M. resulted in a forecast value of 1.00 which exceeds the threshold of 0.90 for cloud memory utilization. An alert can be an announcement that warns about a value. A threshold can be the magnitude that must be satisfied for a certain result or condition to occur.

The time series database system can provide the multi-scale forecasts to dashboards and visualizations. Traditionally, dashboards and visualizations have displayed historical values of time series data. Powered by forecasting, the time series database system can also depict likely future trajectories of time series data. Such visuals can help a time series database system user to quickly get a sense for where a time series data point is likely headed.

FIG. 1 depicts an example of the x values at the times t=1 to 5 in a training set of time series as 0.50@9:01 A.M., 0.50@9:02 A.M., 0.49@9:03 A.M., 0.53@9:04 A.M, and 0.62@9:04 A.M, and the x value at the time t=6 in production data as 0.78@9:06 A.M. A value can be the numerical amount denoted by an algebraic term, a magnitude, quantity, or number. A time can be a clearly identified chronological point as measured in hours and minutes past midnight or noon. A training set can be a collection of distinct entities regarded as a unit, and which is used for instruction and/or learning.

The time series database system builds forecasting timescale models for multiple timescales with each timescale equated to a corresponding lag of time. FIG. 1 depicts an example of the timescale k=0, 1, and 2 minutes, or 0-lag time, 1-lag time, and 2-lag times for differences between the x values at the times t=1 to 5 in a training set of a time series and the x value at the time t=6 in production data. Although the examples describe forecast timescale models for 3-timescales or 3-lag times, the timescales k=0, 1, or 2, minutes, or 0, 1, or 2-lag times, the time series database system can apply forecast timescale models for any number of timescales, and the units for each timescale may be any combination of units of time, such as milliseconds, seconds, minutes, hours, days, weeks, months, seasons, or years.

Figure 2:
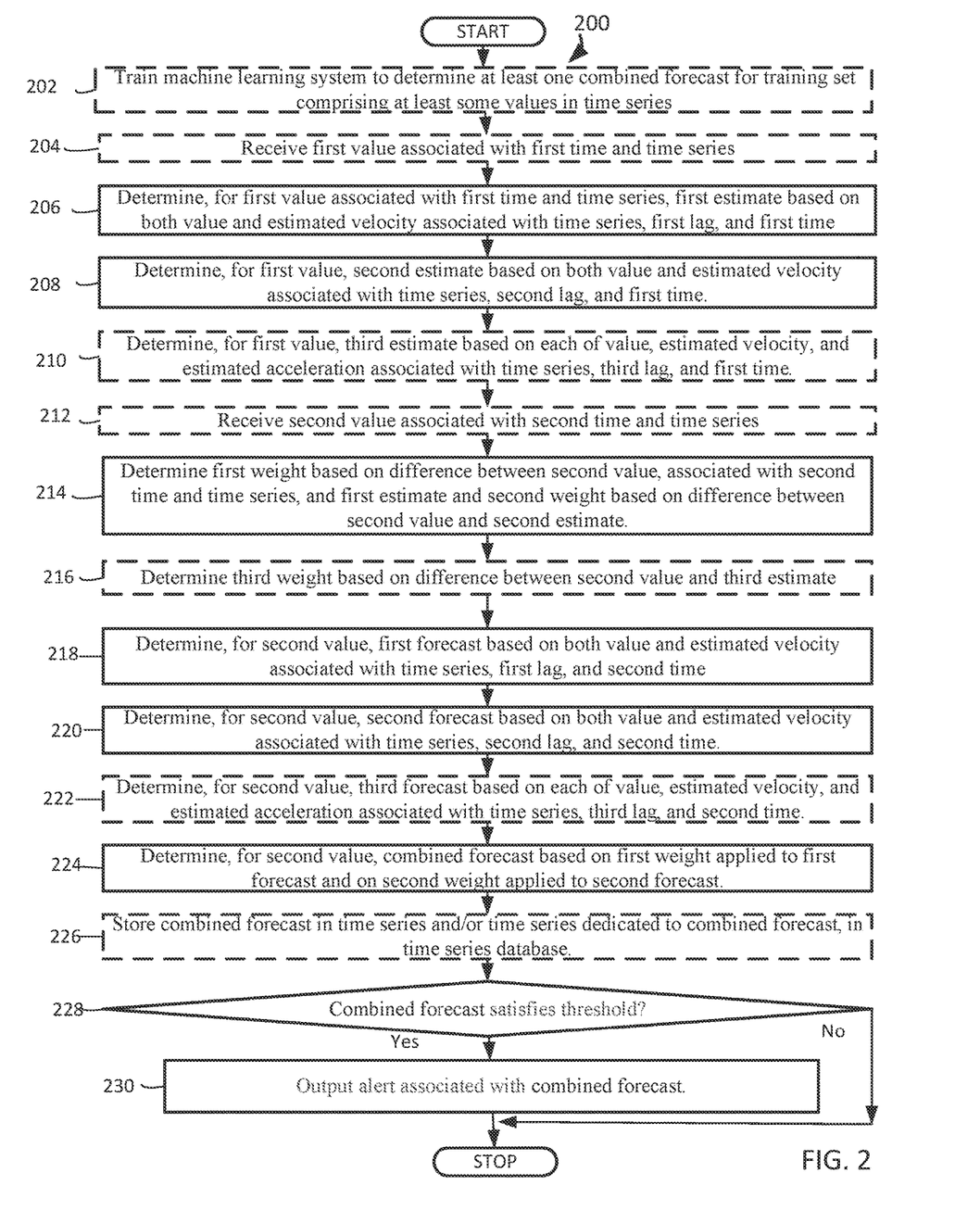
FIG. 2 is an operational flow diagram illustrating a high-level overview of a method for a multi-scale exponential-smoothing forecaster for time series data, in an embodiment.

FIG. 2 is an operational flow diagram illustrating a high-level overview of a method 200 for a multi-scale exponential-smoothing forecaster for time series data. A machine learning system is optionally trained to determine at least one combined forecast for a training set comprising at least some values in a time series, block 202. A system can train a machine learning system to make multi-scale forecasts for time series values. For example, and without limitation, this can include training a machine learning system to use the first timescale model with the 0-lag time to determine the first timescale model's estimate of the x value of a cloud memory utilization time series at 9:04 A.M. by adding the x value of 0.49 at 9:03 A.M. and the velocity 1 (for 0-lag) of −0.01 at 9:03 A.M., which equals 0.48. FIG. 1 depicts velocity 1 (for 0-lag) of −0.01 at 9:03 A.M as v1@t3=x(0.49)@t3−x(0.50)@t2=−0.01.

The machine-learning system also uses the second timescale model with the 1-lag time to determine the second timescale model's estimate of the x value of the cloud memory utilization time series at 9:04 A.M. by adding the x value of 0.50 at 9:02 A.M. (which is 1-lag time behind the x value of 0.49 at 9:03 A.M.) and the velocity 2 (for 1-lag) of −0.01 at 9:03 A.M., which equals 0.49. FIG. 1 depicts velocity 2 (for 1-lag) of −0.01 at 9:03 A.M as v2@t3=x(0.49)@t3−x(0.50)@t1=−0.01.

The first timescale model with the 0-lag and the second timescale model with the 1-lag do not use the acceleration 1 (for 0-lag) or the acceleration 2 (for 1-lag) at 9:03 A.M. because the acceleration 2 (for 1-lag) does not exist at 9:03 A.M. Although some examples describe a forecast timescale model that determines estimates or forecasts of time series values based on estimated accelerations, in some embodiments a forecast timescale model does not require the use of estimated acceleration to determine such an estimate or forecast. The machine-learning system does not use the third timescale model with the 2-lag times to determine the third timescale model's estimate of the x value of the cloud memory utilization time series at 9:04 A.M. because neither the velocity 3 (for 2-lags) nor the acceleration 3 (for 2-lags) exist at 9:03 A.M.

The machine-learning system receives the new x value of 0.53 for the cloud memory utilization time series at the time 9:04 A.M. Then the machine-learning system determines the first timescale model's estimate error of 0.05 between the new x value of 0.53 and the first timescale model's estimate of 0.48, and the second timescale model's estimate error of 0.04 between the new x value of 0.53 and the second timescale model's estimate of 0.49. Next, the machine-learning system uses Equation 4 above to determine the weight of 0.497 for the first timescale model's estimate and the weight of 0.503 for the second timescale model's estimate based on the timescale models' relative estimate errors of 0.05 and 0.04, respectively.

Then the machine-learning system uses the first timescale model with the 0-lag time to determine the first timescale model's forecast of the next x value of the cloud memory utilization time series at 9:05 A.M. by adding the most recent x value of 0.53 at 9:04 A.M. and the most recent velocity 1 (for 0-lag) of 0.04 at 9:04 A.M., which equals 0.57. FIG. 1 depicts velocity 1 (for 0-lag) of 0.04 at 9:04 A.M. as v1@t4=x(0.53)@t4−x(0.49)@t3=0.04. The machine-learning system also uses the second timescale model with the 1-lag time to determine the second timescale model's forecast of the next x value of the cloud memory utilization time series at 9:05 A.M. by adding the x value of 0.49 at 9:03 A.M. (which is 1-lag time behind the most recent x value of 0.53 at 9:04 A.M.) and the most recent velocity 2 (for 1-lag) of 0.03 at 9:04 A.M., which equals 0.52. FIG. 1 depicts velocity 2 (for 1-lag) of 0.03 at 9:04 A.M as v2@t4=x(0.53)@t4−x(0.50)@t2=0.03.

Then the machine-learning system applies the first timescale model's weight of 0.497 for the first timescale model's estimate to the first timescale model's forecast of 0.57 and the second timescale model's weight of 0.503 for the second timescale model's estimate to the second timescale model's forecast of 0.52 to determine the multi-scale forecast of 0.55 for the cloud memory utilization time series at 9:05 A.M. Since the multi-scale forecast of 0.55 for the cloud memory utilization time series at 9:05 A.M. is below its capacity alert threshold of 0.90, the machine-learning system does not output a forecast alert that enables immediate allocation of additional cloud memory. After comparing the multi-scale forecast of 0.55 for the cloud memory utilization time series at 9:05 A.M. against the actual x value of 0.62 at 9:05 A.M., the machine-learning system determines a forecast error of 0.07, and then concludes that training is sufficient to forecast values using production data because the forecast error of 0.07 is within the training threshold of 0.10.

After optionally training a machine-learning system, a first value associated with a first time and a time series is optionally received, wherein values of the time series may identify a computer performance, block 204. The system receives a time series data value for forecasting. By way of example and without limitation, this can include a time series database system receiving a time series x value of 62% cloud memory utilization at 9:05 A.M.

Following receipt of the first value associated with the first time and the time series, a first estimate is determined for the first value associated with the first time and the time series, the first estimate being based on both a value and an estimated velocity associated with the time series, a first lag, and the first time, wherein the first estimate may be further based on an estimated acceleration associated with the time series, the first lag, and the first time, block 206. The system uses a forecast timescale model to determine an estimate that will be used to weight the timescale model's future forecasts. In embodiments, this can include the time series database system using the first timescale model with the 0-lag time to determine the first timescale model's estimate of the x value of the cloud memory utilization time series at 9:06 A.M. by adding the x value of 0.62 of the cloud memory utilization time series at 9:05 A.M., the velocity 1 (for 0-lag) of 0.09 at 9:05 A.M., and the acceleration 1 (for 0-lag) of 0.05 at 9:05 A.M., which equals 0.76.

FIG. 1 depicts velocity 1 (for 0-lag) of 0.09 at 9:05 A.M as v1@t5=x(0.62)@t5−x(0.53)@t4=0.09, and also depicts acceleration 1 (for 0-lag) of 0.05 at 9:05 A.M. as a1@t5=v1(0.09)@t5−v1(0.04)@t4=0.05. This example describes a value, an estimated velocity, and an estimated acceleration that are each associated with the time series, a first lag, and the first time. At 9:05 A.M., the x value of 0.62 is the 0-lag x value in the cloud memory utilization time series at 9:05 A.M., the velocity of 0.09 is the 0-lag velocity at 9:05 A.M. which is based on the difference between the x value of 0.62 at 9:05 A.M. and the x value of 0.53 at 9:04 A.M., and the acceleration of 0.05 is the 0-lag acceleration at 9:05 A.M., which is based on the difference between the 0-lag velocity of 0.09 at 9:05 A.M. and the 0-lag velocity of 0.04 at 9:04 A.M.

An estimate can be an approximate determination of a value. Using a timescale model to estimate a value in a time series is substantially similar to using the timescale model to forecast the value in the time series. However, using a timescale model to determine an expected amount of a value in a time series is referred to as an estimate of the value, instead of a forecast of the value, when the time series database system may have already received the value for which the expected amount is being determined. Next, the time series database system can compare the timescale model's estimate of the value against the received value to determine the estimate error and then determine the corresponding weight to be applied to the timescale model's subsequent forecast. In contrast, using a timescale model to determine an expected amount of a value in a time series is referred to as a forecast of the value, instead of an estimate of the value, when the time series database system has not already received the value for which the expected amount is being determined. The time series database system can apply the weight determined from the timescale model's estimate to the timescale model's forecast to determine the multi-scale forecast. Consequently, the time series database system uses a timescale model to estimate a value in a time series to determine the timescale model's estimate error, which is the basis for determining the timescale model's weight, and then uses the timescale model to forecast the value which is used with the timescale model's weight to determine a multi-scale forecast.

Having determined the first estimate, a second estimate is determined for the first value, the second estimate being based on both a value and an estimated velocity associated with the time series, a second lag, and the first time, wherein the second estimate may be further based on an estimated acceleration associated with the time series, the second lag, and the first time, block 208. The system uses another forecast timescale model to determine another estimate that will be used to weight the other timescale model's future forecasts. For example, and without limitation, this can include the time series database system using the second timescale model with the 1-lag time to determine the second timescale model's estimate of the x value of the cloud memory utilization time series at 9:06 A.M. by adding the x value of 0.53 of the cloud memory utilization time series at 9:04 A.M. (which is 1-lag time behind the x value of 0.62 at 9:05 A.M.), the velocity 2 (for 1-lag) of 0.13 at 9:05 A.M., and the acceleration 2 (for 1-lag) of 0.14 at 9:05 A.M., which equals 0.80.

FIG. 1 depicts velocity 2 (for 1-lag) of 0.13 at 9:05 A.M as v2@t5=x(0.62)@t5−x(0.49)@t3=0.13, and also depicts acceleration 2 (for 1-lag) of 0.14 at 9:05 A.M. as a2@t5=v2(0.13)@t5−v2(−0.01)@t3=0.14. This example describes a value, an estimated velocity, and an estimated acceleration that are each associated with the time series, a second lag, and the first time. At 9:05 A.M., the x value of 0.53 is the 1-lag x value in the cloud memory utilization time series at 9:04 A.M., the velocity of 0.13 is the 1-lag velocity at 9:05 A.M. which is based on the difference between the x value of 0.62 at 9:05 A.M. and the x value of 0.49 at 9:03 A.M. (that is 1-lag behind the x value of 0.53 at 9:04 A.M.), and the acceleration of 0.14 is the 1-lag acceleration at 9:05 A.M., which is based on the difference between the 1-lag velocity of 0.13 at 9:05 A.M. and the 1-lag velocity of −0.01 at 9:03 A.M.

In addition to determining the first and second estimates, a third estimate is optionally determined, for the first value, the third estimate being based on each of a value, an estimated velocity, and an estimated acceleration associated with the time series, a third lag, and the first time, block 210. The system can use an additional forecast timescale model to determine an additional estimate that will be used to weight the additional timescale model's future forecasts. By way of example and without limitation, this can include the time series database system using a third timescale model with 2-lag times to determine the third timescale model's estimate of the x value of the cloud memory utilization time series at 9:06 A.M. by adding the x value of 0.49 of the cloud memory utilization time series at 9:03 A.M. (which is 2-lag times behind the x value of 0.62 at 9:05 A.M.), the velocity 3 (for 2-lags) of 0.12 at 9:05 A.M., and the acceleration 3 (for 2-lags) of 0.14 at 9:05 A.M., which equals 0.75.

FIG. 1 depicts velocity 3 (for 2-lag) of 0.12 at 9:05 A.M as $v3@t5=x(0.62)@t5-x(0.50)@t2=0.12$, and also depicts acceleration 3 (for 2-lag) of 0.14 at 9:05 A.M. as $a3@t5=v3(0.12)@t5-v3(-0.02)@t2=0.14$. This example describes a value, an estimated velocity, and an estimated acceleration that are each associated with the time series, a third lag, and the first time. At 9:05 A.M., the x value of 0.49 is the 2-lags x value in the cloud memory utilization time series at 9:03 A.M., the velocity of 0.12 is the 2-lags velocity at 9:05 A.M. which is based on the difference between the x value of 0.62 at 9:05 A.M. and the x value of 0.50 at 9:02 A.M. (that is 2-lags behind the x value of 0.53 at 9:04 A.M.), and the acceleration of 0.14 is the 2-lags acceleration at 9:05 A.M., which is based on the difference between the 2-lags velocity of 0.12 at 9:05 A.M. and the 2-lags velocity of −0.02 at 9:02 A.M.

In addition to determining the estimates, a second value associated with a second time and the time series is optionally received, block 212. The system receives a time series value for forecasting. In embodiments, this can include the time series database system receiving the production data's time series x value of 78% cloud memory utilization at 9:06 A.M.

After determining the estimates, a first weight is determined based on the difference between the second value and the first estimate and a second weight is determined based on the difference between the second value and the second estimate, block 214. The system determines the weights for each timescale model's subsequent forecast based on the error for each timescale model's previous forecast. For example, and without limitation, this can include the time series database system determining the first timescale model's estimate error of 0.02 between the new x value of 0.78 and the first timescale model's estimate of 0.76, and the second timescale model's estimate error of −0.02 between the new x value of 0.78 and the second timescale model's estimate of 0.80. Then the time series database system uses Equation 4 above to determine the weight of 0.50 for the first timescale model's estimate and the weight of 0.50 for the second timescale model's estimate based on the timescale models' relative estimate errors of 0.02 and −0.02, respectively. A difference can be the remainder left after subtraction of one value from another value.

Following the determination of the first and second weights, a third weight is optionally determined based on a difference between the second value and the third estimate, block 216. The system can determine the weight for another timescale model's subsequent forecast based on the error for the other timescale model's previous forecast. By way of example and without limitation, this can include the time series database system determining the third timescale model's estimate error of 0.03 between the new x value of 0.78 and the third timescale model's estimate of 0.75. Then the time series database system uses Equation 4 above to determine the weight of 0.34 for the first timescale model's estimate, the weight of 0.34 for the second timescale model's estimate, and the weight of 0.32 for the third timescale model's estimate based on the timescale models' relative estimate errors of 0.02, −0.02, and 0.03, respectively.

Having determined the weights, a first forecast is determined for the second value, the first forecast being based on both a value and an estimated velocity associated with the time series, the first lag, and the second time, wherein the first forecast may be further based on an estimated acceleration associated with the time series, the first lag, and the second time, block 218. The system uses a forecast timescale model to forecast a value in a time series. In embodiments, this can include the time series database system using the first timescale model with the 0-lag time to determine the first timescale model's forecast of the next x value of the cloud memory utilization time series at 9:07 A.M. by adding the most recent x value of 0.78 at 9:06 A.M. the most recent velocity 1 (for 0-lag) of 0.16 at 9:06 A.M., and the most recent acceleration 1 (for 0-lag) of 0.07 at 9:06 A.M., which equals 1.01.

FIG. 1 depicts velocity 1 (for 0-lag) of 0.16 at 9:06 A.M as $v1@t6=x(0.78)@t6-x(0.62)@t5=0.16$, and also depicts acceleration 1 (for 0-lag) of 0.07 at 9:06 A.M. as $a1@t6=v1(0.16)@t6-v1(0.09)@t5=0.07$. This example describes a value, an estimated velocity, and an estimated acceleration that are each associated with the time series, the first lag, and the second time. At 9:06 A.M., the x value of 0.78 is the 0-lag x value in the cloud memory utilization time series at 9:06 A.M., the velocity of 0.16 is the 0-lag velocity at 9:06 A.M. which is based on the difference between the x value of 0.78 at 9:06 A.M. and the x value of 0.62 at 9:05 A.M., and the acceleration of 0.07 is the 0-lag acceleration at 9:06 A.M., which is based on the difference between the 0-lag velocity of 0.16 at 9:06 A.M. and the 0-lag velocity of 0.09 at 9:05 A.M.

In addition to determining the first forecast, a second forecast is determined, for the second value, the second forecast being based on both a value and an estimated velocity associated with the time series, the second lag, and the second time, wherein the second forecast may be further based on an estimated acceleration associated with the time series, the second lag, and the second time, block 220. The system uses another forecast timescale model to forecast a value in a time series. For example, and without limitation, this can include the time series database system using the second timescale model with the 1-lag time to determine the second timescale model's forecast of the next x value of the cloud memory utilization time series at 9:07 A.M. by adding the x value of 0.62 of the cloud memory utilization time series at 9:05 A.M (which is 1-lag time behind the most recent x value of 0.78 at 9:06 A.M.), the most recent velocity 2 (for 1-lag) of 0.25 at 9:06 A.M., and the most recent acceleration 2 (for 1-lag) of 0.22 at 9:06 A.M., which equals 1.09.

FIG. 1 depicts velocity 2 (for 1-lag) of 0.25 at 9:06 A.M as v2@t6=x(0.78)@t6−x(0.53)@t4=0.25, and also depicts acceleration 2 (for 1-lag) of 0.22 at 9:06 A.M. as a2@t6=v2 (0.25)@t6−v2(0.03)@t4=0.22. This example describes a value, an estimated velocity, and an estimated acceleration that are each associated with the time series, the second lag, and the second time. At 9:06 A.M., the x value of 0.62 is the 1-lag x value in the cloud memory utilization time series at 9:05 A.M., the velocity of 0.25 is the 1-lag velocity at 9:06 A.M. which is based on the difference between the x value of 0.78 at 9:06 A.M. and the x value of 0.53 at 9:04 A.M. (that is 1-lag behind the x value of 0.62 at 9:05 A.M.), and the acceleration of 0.22 is the 1-lag acceleration at 9:06 A.M., which is based on the difference between the 1-lag velocity of 0.25 at 9:06 A.M. and the 1-lag velocity of 0.03 at 9:04 A.M.

After determining the first and second forecasts, a third forecast is optionally determined for the second value, the third forecast being based on each of a value, an estimated velocity, and an estimated acceleration associated with the time series, a third lag, and the second time, block 222. The system can use an additional forecast timescale model to forecast a value in a time series. By way of example, and without limitation, this can include the time series database system using the third timescale model with the 2-lag times to determine the third timescale model's forecast of the next x value of the cloud memory utilization time series at 9:07 A.M. by adding the x value of 0.53 of the cloud memory utilization time series at 9:04 A.M (which is 2-lag times behind the most recent x value of 0.78 at 9:06 A.M.), the most recent velocity 3 (for 2-lags) of 0.29 at 9:06 A.M., and the most recent acceleration 3 (for 2-lags) of 0.31 at 9:06 A.M., which equals 1.13.

FIG. 1 depicts velocity 3 (for 2-lag) of 0.29 at 9:06 A.M as v3@t6=x(0.78)@t6−x(0.49)@t3=0.29, and also depicts acceleration 3 (for 2-lag) of 0.31 at 9:06 A.M. as a3@t6=v3 (0.29)@t6−v3(−0.02)@t3=0.31. This example describes a value, an estimated velocity, and an estimated acceleration that are each associated with the time series, the third lag, and the second time. At 9:06 A.M., the x value of 0.53 is the 2-lags x value in the cloud memory utilization time series at 9:04 A.M., the velocity of 0.29 is the 2-lags velocity at 9:06 A.M. which is based on the difference between the x value of 0.78 at 9:06 A.M. and the x value of 0.49 at 9:03 A.M. (that is 2-lags behind the x value of 0.62 at 9:05 A.M.), and the acceleration of 0.31 is the 2-lags acceleration at 9:06 A.M., which is based on the difference between the 2-lags velocity of 0.29 at 9:06 A.M. and the 2-lags velocity of −0.02 at 9:03 A.M.

The examples above describe the time series database system using the most recent values, most recent estimated velocities, and most recent accelerations to estimate values of time series and forecast values of time series. Although using the most recent data may generally result in determining the most accurate estimates and the most accurate forecasts, the time series database system does not require the most recent data to determine accurate estimates and accurate forecasts. For example, a timescale model that operates on a large timescale, such as seasonal or annual, may estimate and then forecast the most accurate seasonal or annual values for a time series without using the 5 most recent minutes of the time series' data.

Following the determination of the forecasts, a combined forecast is determined, for the time series, the combined forecast being based on the first weight applied to the first forecast and the second weight applied to the second forecast, wherein the combined forecast may be further based on the third weight applied to the third forecast, block 224. The system determines a multi-timescale model forecast of a value in a time series by weighing each timescale model's forecast by the accuracy of each timescale model's previous forecast. In embodiments, this can include the time series database system applying the first timescale model's weight of 0.50 for the first timescale model's estimate to the first timescale model's forecast of 1.01 and the second timescale model's weight of 0.50 for the second timescale model's estimate to the second timescale model's forecast of 1.09 to determine the multi-scale forecast of 1.05 for the cloud memory utilization time series at 9:07 A.M. In an alternative example, the time series database system applies the first timescale model's weight of 0.34 for the first timescale model's estimate to the first timescale model's forecast of 1.01, the second timescale model's weight of 0.34 for the second timescale model's estimate to the second timescale model's forecast of 1.09, and the third timescale model's weight of 0.32 for the third timescale model's estimate to the third timescale model's forecast of 1.13 to determine the multi-scale forecast of 1.08 for the cloud memory utilization time series at 9:07 A.M.

The combined forecast may be further based on another weight applied to another forecast for another time series. For example, the time series database system determines the cloud memory utilization timescale model's estimate error of 0.02 between the new cloud memory utilization value of 0.78 and the cloud memory utilization timescale model's estimate of 0.76, and the CPU utilization timescale model's estimate error of 0.14 between the new cloud memory utilization value of 0.78 and the CPU utilization timescale model's estimate of 0.64. Then the time series database system uses Equation 4 above to determine the weight of 0.53 for the cloud memory utilization timescale model's estimate and the weight of 0.47 for the CPU utilization timescale model's estimate based on their relative estimate errors of 0.02 and 0.14, respectively. Next, the time series database system applies the cloud memory utilization timescale model's weight of 0.53 for the cloud memory utilization timescale model's estimate to the cloud memory utilization timescale model's forecast of 1.08 and the CPU utilization timescale model's weight of 0.47 for the CPU utilization timescale model's estimate to the CPU utilization timescale model's forecast of 0.88 to determine the multivariate multi-scale forecast of 0.986 for the cloud memory utilization time series at 9:07 A.M.

In addition to determining the combined forecast, a time series database system optionally stores the combined forecast in the time series and/or a time series dedicated to the combined forecast, in a time series database, block 226. The system stores multi-scale forecasts for a value in the value's time series and/or the combined forecast's own time series. For example, and without limitation, this can include the time series database system storing the multivariate multi-scale forecast of 0.986 for the cloud memory utilization time series at 9:07 A.M. in the cloud memory utilization time series and in a dedicated forecast cloud memory utilization's time series, which are in the same time series database.

After determining the combined forecast, a determination is made whether the combined forecast satisfies a threshold, block 228. The system determines whether to output an alert for the multi-scale forecast of a value in the time series. By way of example, and without limitation, this can include the time series database system determining whether the multivariate multi-scale forecast of 0.986 for the cloud memory utilization time series at 9:07 A.M. satisfies the cloud memory capacity alert threshold of 0.90, If the combined forecast satisfies the threshold, the method 200 continues to block 230 to output an alert for the combined forecast. If the combined forecast does not satisfy the threshold, the method 200 terminates for the new value, which enables the processing of another value in the same or a different time series In response to a determination that the combined forecast satisfies a threshold, an alert is output by a time series database system, block 230. The system outputs an alert for a multi-scale forecast that satisfies its threshold. In embodiments, this can include the time series database system outputting a forecast alert that enables immediate allocation of additional cloud memory because the multivariate multi-scale forecast of 0.986 for the cloud memory utilization time series at 9:07 A.M. is above its capacity alert threshold of 0.90.

The method 200 may be repeated as desired. Although this disclosure describes the blocks 202-230 executing in a particular order, the blocks 202-230 may be executed in a different order. In other implementations, each of the blocks 202-230 may also be executed in combination with other blocks and/or some blocks may be divided into a different set of blocks.

System Overview

Figure 3:
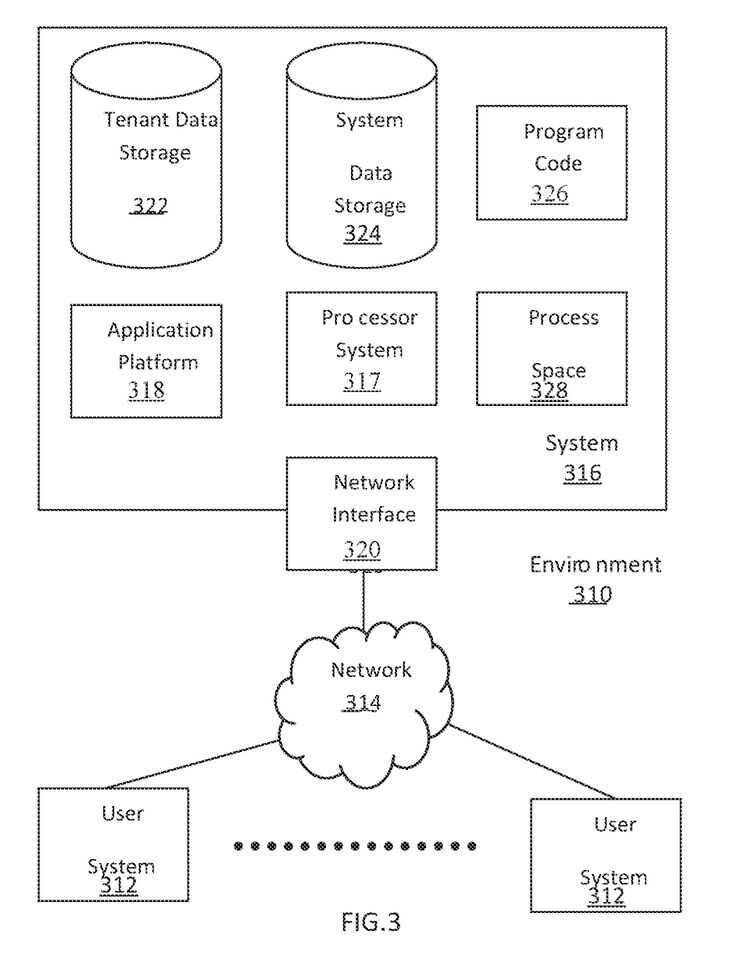
FIG. 3 illustrates a block diagram of an example of an environment wherein an on-demand database service may be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a workstation, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages, and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
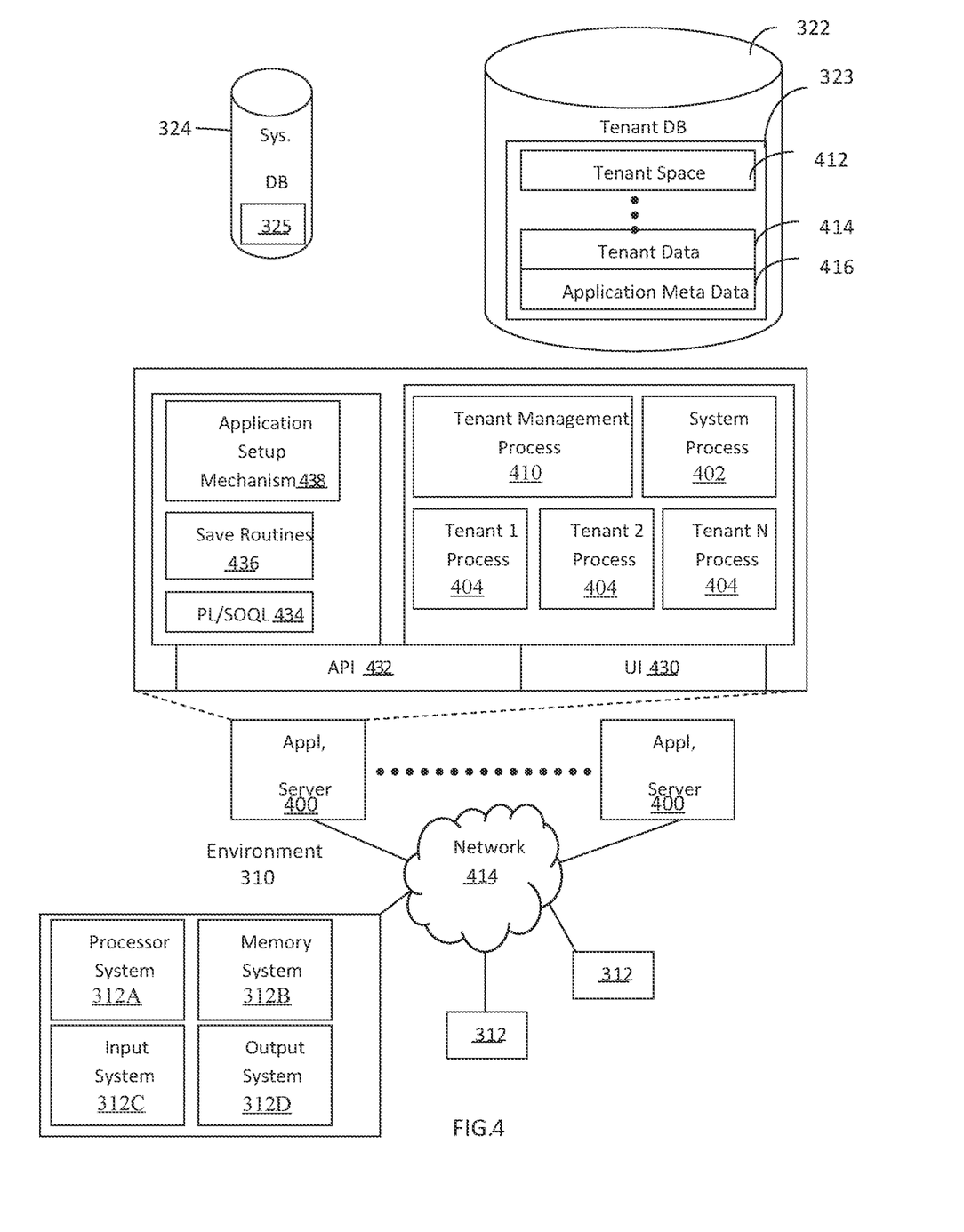
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412.

The UI 430 provides a user interface, and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for a multi-scale exponential-smoothing forecaster for time series data, the system comprising:
one or more processors; and
a non-transitory computer readable medium storing a plurality of instructions, which when executed, cause the one or more processors to:
receive time series data indicative of a resource utilization by an application over time, wherein the time series data includes a current value indicative of a current utilization of a resource by the application at a current time;
determine a forecasted future value in the time series data, wherein the determining includes:
determining, for the current value, a first estimate of the current value based on a first prior value and a first velocity indicating a first rate of change associated with the first prior value, wherein the first prior value precedes the current value in the time series data by a first time interval;
determining, for the current value, a second estimate of the current value based on a second prior value and a second velocity indicating a second rate of change associated with the second prior value, wherein the second prior value precedes the current value in the time series data by a second, different time interval;
determining a first weight indicative of an accuracy of the first estimate by comparing the first estimate to the current value;
determining a second weight indicative of an accuracy of the second estimate by comparing the second estimate to the current value; and
forecasting the future value by:
determining first and second estimates of the future value based on the current value and the first prior value; and
combining the first and second estimates of the future value adjusted based on the first and second weights in a manner that implements multi-scale exponential-smoothing; and
provide, via a user interface, an alert associated with the resource utilization based on the determined forecasted future value satisfying a threshold.

2. The system of claim 1, wherein the plurality of instructions further causes the one or more processors to train a machine learning system to determine at least one forecasted future value for a training set comprising at least some values in the time series data.

3. The system of claim 1, wherein the resource utilization includes a memory utilization of a cloud-based application.

4. The system of claim 1, wherein the first estimate of the current value is further based on a first acceleration associated with the first prior value, wherein the first acceleration is a difference between the first velocity and the second velocity.

5. The system of claim 1, wherein the plurality of instructions further causes the one or more processors to:
determine, for the current value, a third estimate of the current value based on a third prior value and a third velocity indicating a third rate of change associated with the third prior value, wherein the third prior value precedes the current value in the time series data by a third time interval;
determine a third weight indicative of an accuracy of the third estimate by comparing the third estimate to the current value; and
wherein the combining includes combining the first, second, and third estimates of the future value adjusted based on the first, second, and third weights.

6. The system of claim 1, wherein the resource utilization includes a processor utilization of a cloud-based application.

7. The system of claim 1, wherein the resource utilization describes a performance metric of a cloud-based application.

8. A non-transitory computer-readable medium have programing instructions for a multi-scale exponential-smoothing forecaster stored therein that are executable by a computing system to:
receive time series data indicative of a resource utilization by an application over time, wherein the time series data includes a current value indicative of a current utilization of a resource by the application at a current time;
determine a forecasted future value in the time series data, wherein the determining includes:
determining, for the current value, a first estimate of the current value based on a first prior value and a first velocity indicating a first rate of change associated with the first prior value, wherein the first prior value precedes the current value in the time series data by a first time interval;
determining, for the current value, a second estimate of the current value based on a second prior value and a second velocity indicating a second rate of change associated with the second prior value, wherein the second prior value precedes the current value in the time series data by a second, different time interval;
determining a first weight indicative of an accuracy of the first estimate by comparing the first estimate to the current value;
determining a second weight indicative of an accuracy of the second estimate by comparing the second estimate to the current value; and
forecasting the future value by:
determining first and second estimates of the future value based on the current value and the first prior value; and
combining the first and second estimates of the future value adjusted based on the first and second weights in a manner that implements multi-scale exponential-smoothing; and
provide an alert via a user interface based on the determined forecasted future value satisfying a threshold.

9. The computer-readable medium of claim 8, wherein the program instructions are further executable to train a machine learning system to determine at least one forecasted future value for a training set comprising at least some values in the time series data.

10. The computer-readable medium of claim 8, wherein the resource utilization includes a memory utilization of a cloud-based application.

11. The computer-readable medium of claim 8, wherein the first estimate of the current value is further based on a first acceleration associated with the first prior value, wherein the first acceleration is a difference between the first velocity and the second velocity.

12. The computer-readable medium of claim 8, wherein the program instructions are further executable to:
determine, for the current value, a third estimate of the current value based on a third prior value and a third velocity indicating a third rate of change associated with the third prior value, wherein the third prior value precedes the current value in the time series data by a third time interval;
determine a third weight indicative of an accuracy of the third estimate by comparing the third estimate to the current value; and
wherein the combining includes combining the first, second, and third estimates of the future value adjusted based on the first, second, and third weights.

13. The computer-readable medium of claim 8, wherein the resource utilization includes a processor utilization of a cloud-based application.

14. The computer-readable medium of claim 8, wherein the resource utilization describes a performance metric of a cloud-based application.

15. A computer-implemented method for a multi-scale exponential-smoothing forecaster for time series data, the method comprising:
receiving time series data indicative of a resource utilization by an application over time, wherein the time series data includes a current value indicative of a current utilization of a resource by the application at a current time; and
providing an alert via a user interface based on a forecasted future value in the time series data satisfying a threshold, wherein determining the forecasted future value includes:
determining, for the current value, a first estimate of the current value based on a first prior value and a first velocity indicating a first rate of change associated with the first prior value, wherein the first prior value precedes the current value in the time series data by a first time interval;
determining, for the current value, a second estimate of the current value based on a second prior value and a second velocity indicating a second rate of change associated with the second prior value, wherein the second prior value precedes the current value in the time series data by a second, different time interval;
determining a first weight indicative of an accuracy of the first estimate by comparing the first estimate to the current value;
determine a second weight indicative of an accuracy of the second estimate by comparing the second estimate to the current value; and
forecasting the future value by:
determining first and second estimates of the future value based on the current value and the first prior value; and
combining the first and second estimates of the future value adjusted based on the first and second weights in a manner that implements multi-scale exponential-smoothing.

16. The computer-implemented method of claim 15, wherein the computer-implemented method further comprises training a machine learning system to determine at least one forecasted future value for a training set comprising at least some values in the time series data.

17. The computer-implemented method of claim 15, wherein the resource utilization includes a memory utilization of a cloud-based application.

18. The computer-implemented method of claim 15, wherein the first estimate of the current value is further based on a first acceleration associated with the first prior value, wherein the first acceleration is a difference between the first velocity and the second velocity.

19. The computer-implemented method of claim 15, wherein the computer-implemented method further comprises:
determining, for the current value, a third estimate of the current value based on a third prior value and a third velocity indicating a third rate of change associated with the third prior value, wherein the third prior value precedes the current value in the time series data by a third time interval;

determining a third weight indicative of an accuracy of the third estimate by comparing the third estimate to the current value; and wherein the combining includes combining the first, second, and third estimates of the future value adjusted based on the first, second, and third weights.

20. The computer-implemented method of claim 15, wherein the resource utilization describes a performance metric of a cloud-based application.

* * * * *